US008526674B2

(12) United States Patent
Patti

(10) Patent No.: US 8,526,674 B2
(45) Date of Patent: Sep. 3, 2013

(54) MOTION-BASED, MULTI-STAGE VIDEO SEGMENTATION WITH MOTION BOUNDARY REFINEMENT

(75) Inventor: Andrew J Patti, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 13/018,090

(22) Filed: Jan. 31, 2011

(65) Prior Publication Data

US 2012/0195500 A1 Aug. 2, 2012

(51) Int. Cl.
*G06K 9/00* (2006.01)
(52) U.S. Cl.
USPC .......................................................... 382/103
(58) Field of Classification Search
USPC ................... 382/103, 154, 162–167
See application file for complete search history.

(56) References Cited

U.S. PATENT DOCUMENTS

| 2008/0130744 A1 | 6/2008 | Huang et al. |
| 2009/0196349 A1 | 8/2009 | Park et al. |

OTHER PUBLICATIONS

Yuri Boykov and Vladimir Kolmogorov, "An experimental comparison of min-cut/max-flow algorithms for energy minimization in vision," IEEE Trans. Pattern Anal. Mach. Intell., vol. 26, No. 9, pp. 1124-1137, 2004.
Michael M. Chang, M. Ibrahim Sezan, and A. Murat Tekalp, "Adaptive bayesian segmentation of color images," Journal of Electronic Imaging, vol. 3, pp. 404-414, Oct. 1994.
Olivier Brouard, Fabrice Delannay, Vincent Ricordel, and Dominique Barba, "Spatio-temporal segmentation and regions tracking of high definition video sequences based on a markov random field model," in ICIP. 2008, pp. 1552-1555, IEEE.
Vladimir Kolmogorov and Ramin Zabih, "Computing visual correspondence with occlusions via graph cuts," in ICCV, 2001, pp. 508-515.
Junqing Chen, Thrasyvoulos N. Pappas, Aleksandra Mojsilovic, and Bernice E. Rogowitz, "Adaptive perceptual color-texture image segmentation," IEEE Transactions on Image Processing, vol. 14, No. 10, pp. 1524-1536,2005.
Yang Wang, Kia-Fock Loe, Tele Tan, and Jian-Kang Wu, "Spatiotemporal video segmentation based on graphical models," IEEE Transactions on Image Processing, vol. 14, No. 7, pp. 937-947, 2005.
Michael M. Chang, A. Murat Tekalp, and M. Ibrahim Sezan, "Simultaneous motion estimation and segmentation," IEEE Transactions on Image Processing, vol. 6, No. 9, pp. 1326-1333, 1997.

*Primary Examiner* — Alex Liew

(57) ABSTRACT

A motion-based, multi-stage segmentation of a video frame is provided. A first segmentation stage identifies motion boundaries in a plurality of sub-blocks of the video frame. The motion boundaries are identified by computing an occlusion-insensitive localized motion cost and minimizing a MAP-MRF energy based on the localized motion cost. A second segmentation stage refines the motion boundaries by adding a color cost to the localized motion cost in the MAP-MRF energy.

19 Claims, 7 Drawing Sheets

MOTION-BASED, MULTI-STAGE VIDEO SEGMENTATION WITH MOTION BOUNDARY REFINEMENT

BACKGROUND

The segmentation of video sequences into different objects and/or regions is an important task in numerous applications, ranging from video processing, coding, retrieval, and indexing, to object tracking and detection, surveillance, scene analysis, and multimedia content editing and manipulation, among others. Depending on the application, the segmentation may be based on different criteria, such as, for example, color, texture, motion, or a combination thereof. In the case of motion-based segmentation, the goal is to find regions that are characterized by a coherent motion. Doing so presents a challenge, as accurate estimation of motion in different regions requires a good segmentation, and a good segmentation cannot be obtained without accurate motion estimates.

A promising motion-based segmentation technique that has received significant attention formulates the problem as an energy minimization within a maximum a-posteriori, Markov random field ("MAP-MRF") framework. Pixels are labeled in different classes and a motion cost function is computed and optimized to segment a given frame according to the pixels motion. Special attention must be paid to avoid misalignment of motion and actual object boundaries. For example, pixels in a flat region may appear stationary even if they are moving and/or erroneous labels may be assigned to pixels in covered or uncovered regions due to occlusion. As with any motion-based segmentation, the success of the MAP-MRF framework is closely tied to the accuracy of the estimated motion.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A motion-based, multi-stage video segmentation is disclosed. The video segmentation takes a video sequence having multiple video frames and segments each video frame into different regions according to their motion. The video frames are divided into sub-blocks and a robust segmentation is performed in multiple stages within each sub-block. The multi-stage segmentation implements a MAP-MRF framework based on a localized and color-based motion cost to achieve a boundary-accurate and computationally-efficient segmentation.

In various embodiments, the motion-based, multi-stage video segmentation includes a first segmentation stage to determine motion boundaries and a second segmentation stage to automatically refine the motion boundaries using a color-based refinement strategy. A motion boundary, as generally described herein, refers to a collection of pixels delineating regions associated with different motions. For example, in a sub-block having two different motions, the motion boundary divides the sub-block into two regions associated with the two motions.

The first segmentation stage, as described in more detail herein below, segments a sub-block into two motion classes by computing a localized motion cost that performs well along motion boundaries while dealing with occlusion along three consecutive frames. The second segmentation stage improves the accuracy of the motion boundaries by adding color clustering to the motion cost.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments.

Figure 1:
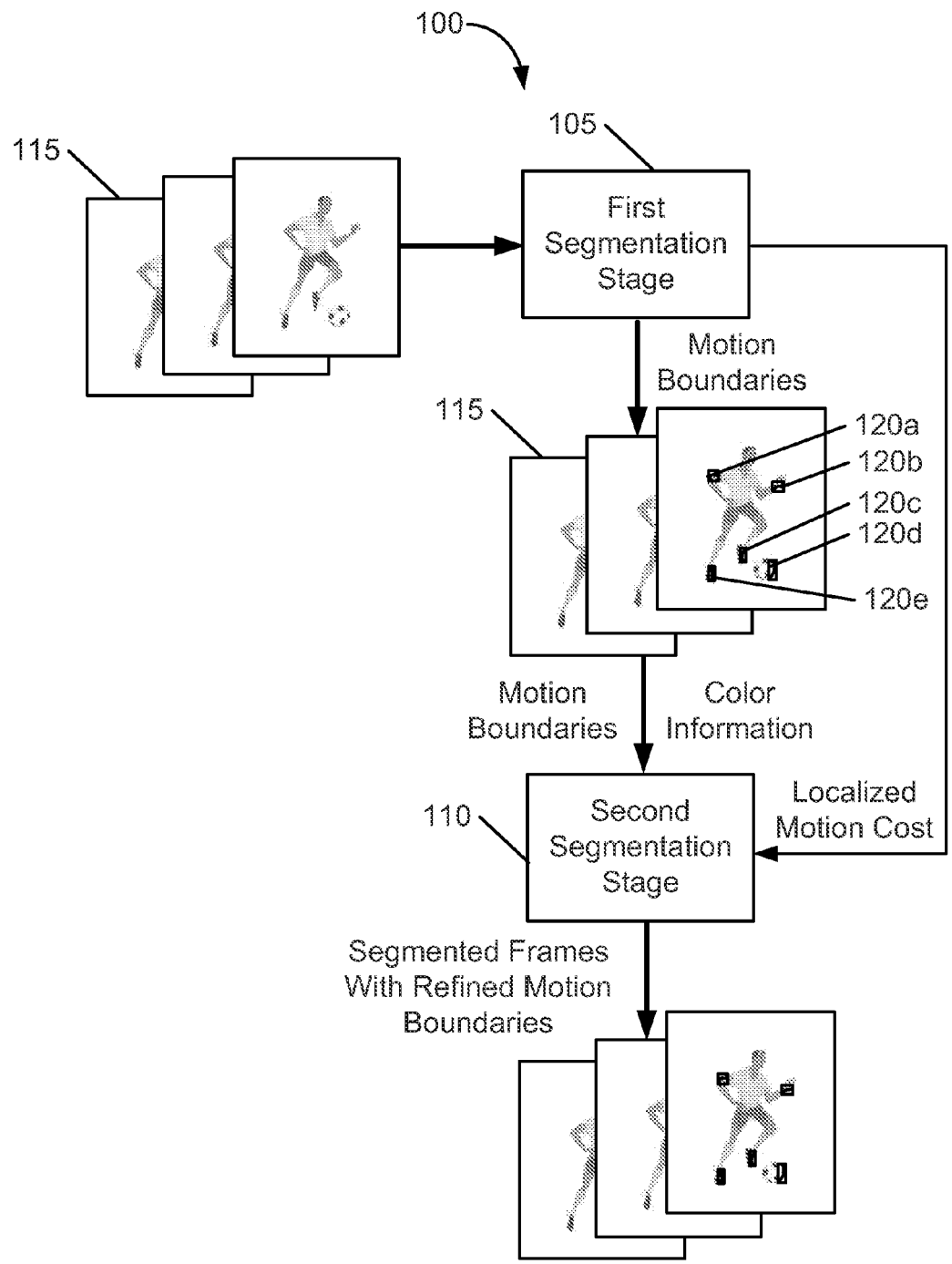
FIG. 1 illustrates a schematic diagram of a motion-based, multi-stage video segmentation.

Referring now to FIG. 1, a schematic diagram of a motion-based, multi-stage video segmentation is illustrated. In various embodiments, the motion-based, multi-stage video segmentation 100 may include two or more segmentation stages, such as, for example, a first segmentation stage 105 and a second segmentation stage 110. The motion-based, multi-stage video segmentation 100 takes a video sequence 115 having multiple video frames and segments each frame into different regions according to their motion. The video frames are composed of three channels (e.g., luminance/luma and color channels) and are divided into sub-blocks. The size of a sub-block is chosen to be small enough (e.g., 8×8, 16×16, 32×32, or 64×64 depending on the size of the video frames) so that each motion is approximately translational.

A robust segmentation is performed in the first segmentation stage 105 and in the second segmentation stage 110 within each sub-block. The first segmentation stage 105, described in more detail herein below with reference to FIGS. 2-3, operates on sub-blocks of three consecutive frames, k−1, k, and k+1, to determine motion boundaries for a set of motion classes, for example, motion boundaries 120a-e. The motion boundaries are determined using a MAP-MRF framework in which segmentation into different motion classes is formulated as an energy minimization problem with the MAP-MRF energy defined by:

$$E(l) = E_r(l) + E_d(l) \qquad \text{(Eq. 1)}$$

where $l$ is a labeling over all image pixel sites, $s$, $E_r$ is a regularization, or smoothness term, resulting in a MRF, and $E_d$ is a measure of how well the actual motion data fits the labeling. In one embodiment, motion boundaries are determined for two motion classes $m_1$ and $m_2$, such that $l_s \in m_1, m_2$. The regularization term is formed with a 4-neighbor Potts model and the $E_d$ term is formed with an occlusion-insensitive localized motion cost that includes both forward and backward motions, with the backward motion cost computed between frames k−1 and k and the forward motion cost computed between frames k and k+1.

The localized motion cost is recomputed in the second segmentation stage 110 to refine the motion boundaries. The second segmentation stage 110, described in more detail herein below with reference to FIGS. 4-5, adds a color cost to the localized motion cost in forming $E_d$ in Eq. 1, such that the segmentation more closely follows moving object boundaries. The color cost is computed based on an optimal color composition distance ("OCCD") measure.

Figure 2:
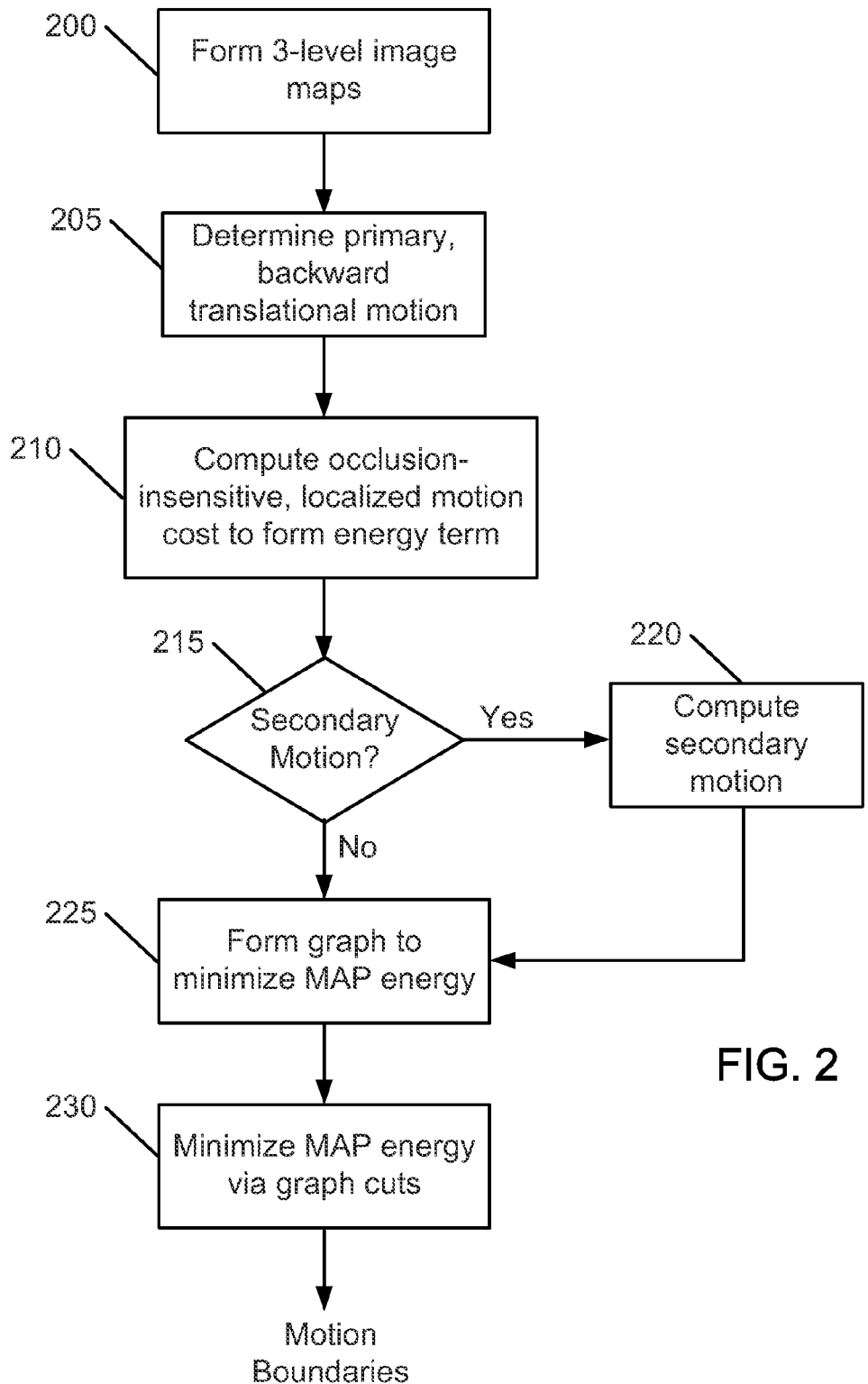
FIG. 2 is a flowchart for identifying motion boundaries in a video frame using a MAP-MRF framework in the first segmentation stage of FIG. 1.
Figure 3:
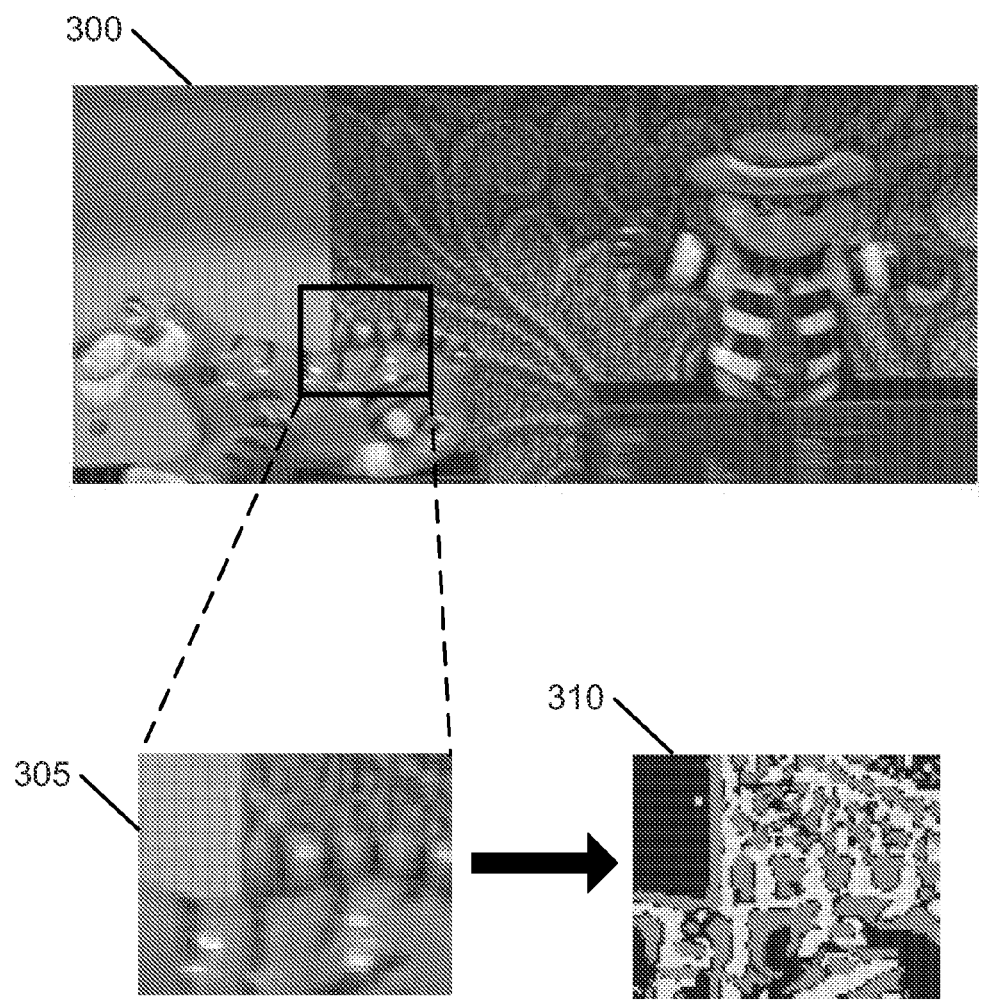
FIG. 3 is an example of a 3-level image map formed in the first segmentation stage of FIG. 1.

Attention is now directed to FIG. 2, which illustrates a flowchart for identifying motion boundaries in a video frame using a MAP-MRF framework in a first segmentation stage. In various embodiments, for a given frame k, a 3-level image map $B_k$ is formed by bandpass filtering and quantization of the luma channel (200). At an edge, $B_k$ colors pixels to one side of an edge with a positive value, and pixels on the other side of the edge with a negative value. Areas with no detail have zero value (black). An example 3-level image map $B_k$ is illustrated in FIG. 3. Image map $B_k$ 310 is shown for a sub-block 305 of a video frame 300.

An important goal of any motion-based segmentation is to closely follow a motion boundary. Generally, a simple block summed absolute differences ("SAD") of pixel values centered around a pixel of interest may be used as a motion cost. However, this method does not perform well near moving object boundaries, since there the SAD block may include pixels from multiple motions. Alternatively, a motion difference at only a single pixel may be too sensitive to color and intensity changes. The 3-level image map $B_k$ 310 enables motion to be computed for a small set of neighboring pixels from the same side of a motion boundary.

Referring back to FIG. 2, the 3-level image maps $B_k$ and $B_{k-1}$ are used to determine a primary, backward translational motion m by XOR correlation (205). This primary backward motion is used to compute an occlusion-insensitive, localized motion cog that forms the energy term $E_d$ in Eq. 1 (210).

A neighborhood of the closest N pixels with the same $B_k$ value is used in order to obtain a set of pixels for an absolute difference measure. This neighborhood, centered at a given pixel site s in frame k and denoted $\mathcal{N}_b(s)$, may be an arbitrary-sized neighborhood contained in a block, such as for example, a 3×3, 5×5, or larger block. In one embodiment, this neighborhood may be limited to a maximum number of pixels.

The backward motion cost for in at pixel site s may therefore be computed as follows:

$$D_m^b(s) = \sum_{s' \in N_b(s)} C_m^b(s') \quad \text{(Eq. 2)}$$

where $C_m^b$ is a coring function determined by:

$$C_m^b(s) = \begin{cases} 0; & \underline{L}(m(s), k-1) \le L(s, k) \le \overline{L}(m(s), k-1) \\ L(s, k) - \overline{L}(m(s), k-1); & L(s, k) > \overline{L}(m(s), k-1) \\ \underline{L}(m(s), k-1) - L(s, k); & L(s, k) < \underline{L}(m(s), k-1) \end{cases} \quad \text{(Eq. 3)}$$

and L(s,k) is the minimum value over a block (e.g., a 3×3, 5×5, or larger) neighborhood (different from the neighborhood $\mathcal{N}_b(s)$) centered at s in frame k, $\overline{L}$(s,k) is the maximum, and m(s) is the translational motion m applied to s. A similar version for the forward motion, denoted $D_m^f(s)$, is also computed between frames k and k+1.

If a secondary motion is present (215), its value is computed by considering the site s in a given sub-block with $B_k(s) \ne 0$ and with the highest backward motion $D_m^b(s)$. At this site s, the backward motion cost $D_m^b(s)$ is computed for each motion m' in a given search range. The m' with the minimum cost $D_m^b(s)$ is then taken as a candidate for the secondary motion (220). If this secondary motion is different from the primary motion m computed for the site s by more than one pixel in either direction, the sub-block is considered to have two motions: the first being the original primary motion m and the second being the secondary motion m'.

It is appreciated that this computation of a primary and a secondary motion has been found to be very robust. It is also appreciated that when only a single motion is determined, there is no motion segmentation required for the sub-block. Avoiding the segmentation for those sub-blocks with a single motion provides a large computational savings.

To form the motion energy term $E_d$ from Eq. 1, special consideration is given to pixel sites where $B_k(s)$ has a zero value, indicating there is no nearby edge. At these sites, there are no significant motion queues, so the energy contribution is set to zero for all motions considered. Then, for $l_s$, a given motion label at site s, the motion energy term $E_d$ in Eq. 1 may be computed as:

$$E_d = \sum_s D_{M(l_s)}(s) \quad \text{(Eq. 4)}$$

where $$D_{M(l_s)}(s) = \min\{I_k^B(s) D_{M(l_s)}^b(s), I_k^B(s) D_{M(l_s)}^f(s)\} \quad \text{(Eq. 5)}$$

and $M(l_s)$ is a mapping to return the motion due to a label value $l_s$, $D_{M(l_s)}^b$ is the backward motion cost, $D_{M(l_s)}^f$ is the forward motion cost, and $I_k^B$ is an indicator function which is equal to one when $B_k$ is non-zero, and equal to zero otherwise.

The energy minimization problem of Eq. 1 is then solved by forming a graph (225) and using graph cuts (230) to compute the minimum energy E(l) of Eq. 1. The minimum energy E(l) is computed with $E_d$ as in Eq. 4 above and with $E_r$ derived from a 4-neighbor Potts model. The Potts model uses a constant cost for different labels that is set proportionally to the maximum pixel site motion cost $D_{M(l_s)}(s)$. The result of the graph cut minimization is therefore a set of motion boundaries for all the sub-blocks of a given frame in which motion is present.

The motion boundaries are refined in the second segmentation stage 110. The goal for this color-based motion boundary refinement is to add a color cost to the motion cost $D_{M(l_s)}(s)$ in forming $E_d$ in Eq. 1, such that the segmentation more closely follows the moving object boundaries.

Figure 4:
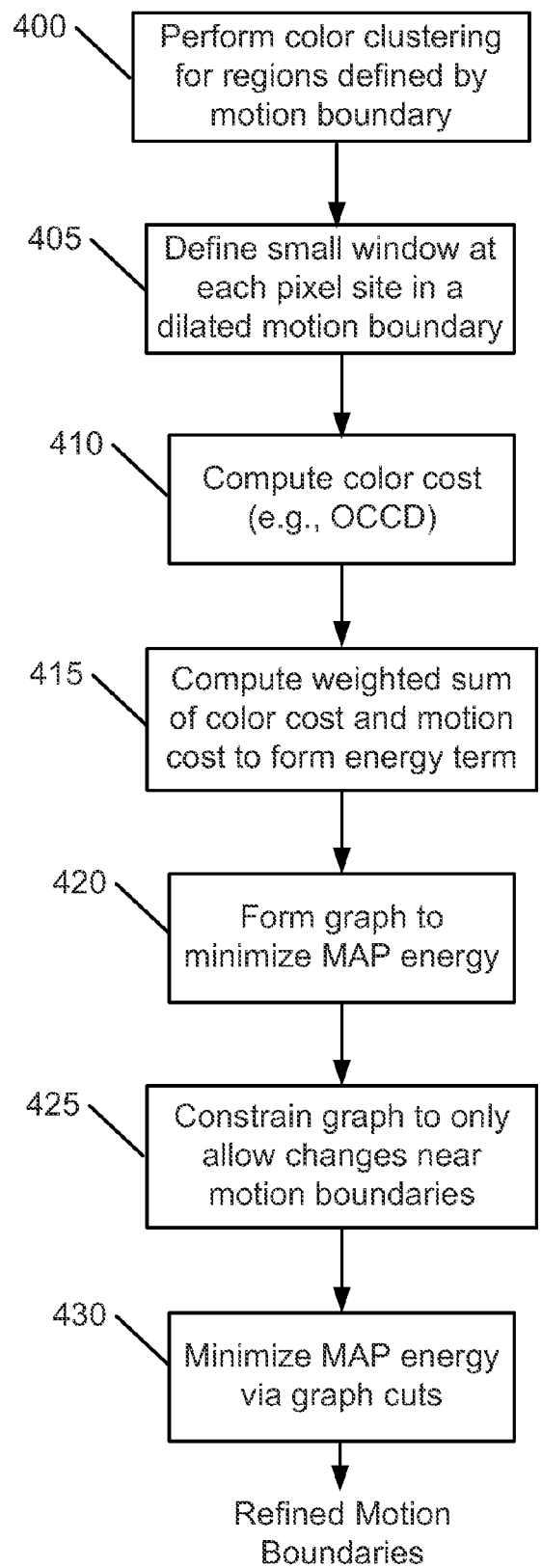
FIG. 4 is a flowchart for refining motion boundaries in the second segmentation stage of FIG. 1.

Referring now to FIG. 4, a flowchart for refining motion boundaries in a second segmentation stage is illustrated. First, given a motion boundary in a sub-block with two motions (e.g., primary and secondary motions), color clustering (e.g., K-means) is used to determine a color composition for each one of the two regions (400). The motion boundary is then dilated (e.g., by two pixels) and a small (e.g., 5×5) window is formed around each pixel site at the dilated boundary (405). Then, at each pixel site, a color cost C is computed as an OCCD measure between the color composition for the window centered at the pixel site and the color composition for the respective motion region (410).

Figure 5:
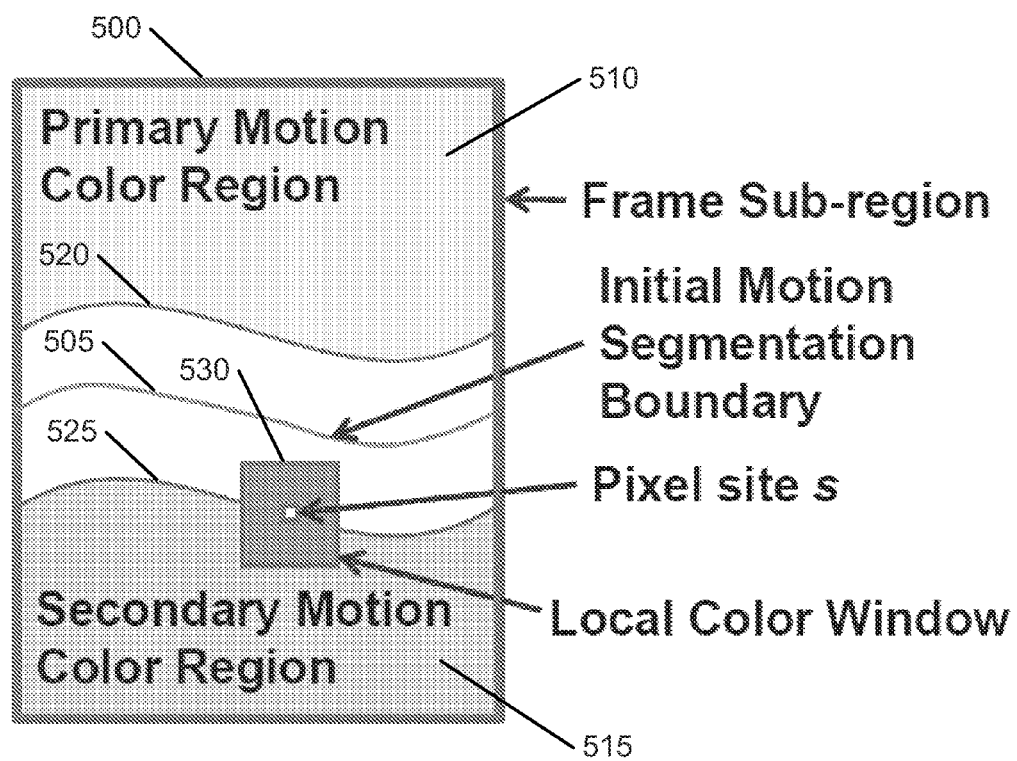
FIG. 5 is a schematic diagram showing the color clustering of FIG. 4 in more detail.

A schematic diagram showing the color clustering and dilated boundary in more detail is shown in FIG. 5. Sub-block 500 has a motion boundary 505 defining two color-clustered regions: primary motion region 510 and secondary motion region 515. The motion boundary 505 is dilated by for example, two pixels to form dilated boundaries 520-525. Small windows are formed around each pixel in the dilated boundaries 520-525, such as, for example, window 530 centered at pixel site s.

Referring back to FIG. 4, the color cost C is added to the motion cost to form a weighted MAP-MRF energy in Eq. 5 such that:

$$D_{M(l_s)}(s) = \min\{I_k^B(s)(w_m D_{M(l_s)}^b(s) + w_c C_{M(l_s)}(s)) J_k^B(s) (w_m D_{M(l_s)}^f(s) + w_c C_{M(l_s)}(s))\} \quad \text{(Eq. 6)}$$

where $C_{M(l_s)}(s)$ is the color cost for a motion label $l_s$, and $w_m$ and $w_c$ are weights assigned to the motion and color costs, respectively. In one embodiment, the relative weighting between the motion and color costs is normalized so that motion costs from zero to their maximum contribute equally with color costs from zero to the OCCD measure between the two color-clustered regions.

A graph is again formed to minimize the MAP energy (420). The resulting graph is constrained to only allow changes near the motion boundaries (e.g., in a window about every boundary pixel) (425). The energy is then minimized via graph cuts (430), resulting in a boundary-accurate segmentation.

It is appreciated that although the color clustering is the most computationally intensive part of the overall segmentation, its cost is mitigated since the computation is only performed on relatively small sub-regions where there are indeed multiple motions. Further, it is of note that any color clustering technique may be used, including computationally simpler and more efficient techniques (e.g., color histograms).

Figure 6:
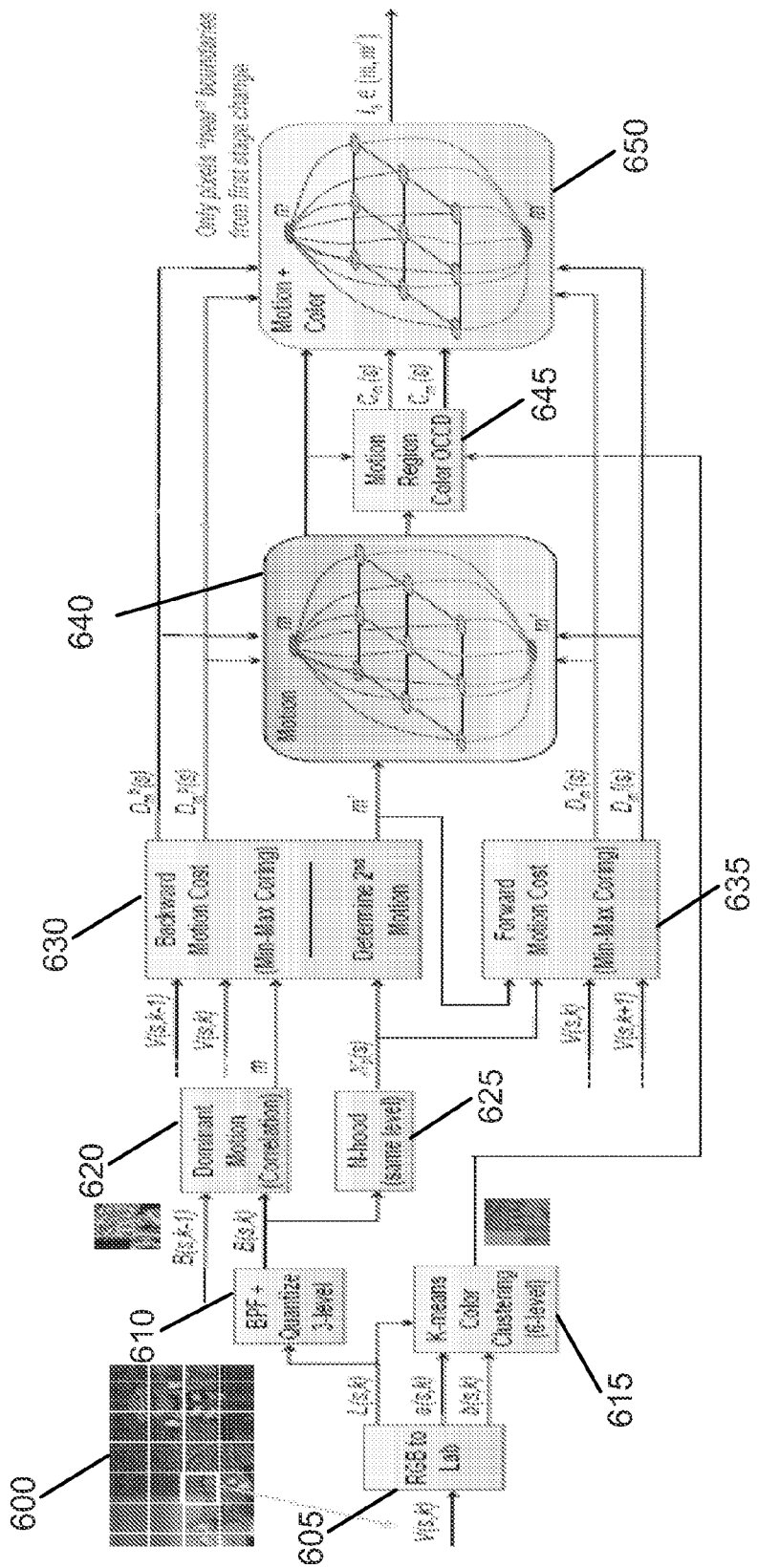
FIG. 6 is a block diagram illustrating the first and the second segmentation stages of FIG. 1 in more detail.

Attention is now directed to FIG. 6, which illustrates the two-stage segmentation described above in more detail. Frame 600 of a video sequence is divided into sub-blocks and each sub-block is segmented according to the motion(s) found in the sub-block. The sub-block is first converted from RBG values V(s,k) to LAB space (605) to generate a luma channel L(s,k) and color channels a(s,k) and b(s,k), where s denotes a pixel site and k denotes the frame k. The luma channel L(s,k) is used to generate the 3-level image maps (610) (see FIGS. 2-3) and the color channels a(s,k) and b(s,k) are used to perform color clustering (615) for motion boundary refinement (see FIGS. 4-5).

With the 3-level image maps of frames k and k−1, a primary, backward translational motion m is determined (620) and a neighborhood $\mathcal{N}_b(s)$ of the closest N pixels with the same $B_k$ value is used in order to obtain a set of pixels for an absolute difference measure (625). The primary motion m, the neighborhood $\mathcal{N}_b(s)$ and RGB values V(s,k) are used to determine whether a secondary motion exists and to compute backward motion costs for the primary and secondary motions, if any (630). A similar computation is also performed to determine the forward motion cost using frames k and k+1 (635). It is appreciated that luma values L(s,k) may be used to determine the motion costs instead of the RGB values V(s,k).

The backward and forward motion costs are used to form the energy term $E_d$ in Eq. 4. The MAP energy is minimized with the use of a graph and graph cuts (640), as described above with reference to FIG. 2. The minimization results in a set of motion boundaries, which are then refined by determining a color cost (645) and adding the color cost to the motion cost in the energy term $E_d$ (see Eq. 6 above). A graph is again formed and the energy is minimized with graph cuts (650), resulting in a boundary-accurate and computationally-efficient motion segmentation.

It is appreciated that in the case of a smooth (e.g., relatively low texture) video frame 605, the motion-based segmentation described above can be simplified. For example, because of the low texture in the frame, a simple frame differencing and thresholding can be used to estimate the primary motion. At the boundary of a smooth region, any motion detected by considering forward and backward frames must be due to a motion boundary. Given this boundary, the color-based refinement of the second segmentation stage 110 may be used while the motion portion of the cost is omitted. In this way, the motion boundary is used to effectively obtain color regions for segmentation.

It is also appreciated that the motion-based, multi-stage segmentation described above considers information from a current region, which is a small subset of a given video frame. Additional robustness may be obtained by considering overlapping regions and forcing consistent decisions between these two regions. For example, a region with a motion boundary that is well centered may be used to initialize color distributions for neighboring regions. This technique may be used both to provide a more robust segmentation, and to merge regions that are completely smooth with appropriate portions of regions where a motion boundary was detected (i.e., appropriate by color comparison as previously described).

It is further appreciated that the motion-based, multi-stage segmentation described above is fast to compute, robust, and easily combined with other sources of information. For example, the segmentation may be used to assist in background removal and replacement in a video conferencing application. Computational efficiency is achieved because each segmentation stage is itself efficiently computable and used to bootstrap the following stage. This is much more computationally efficient since MAP computational requirements grow non-linearly with number of choices that must be considered. Because each segmentation stage efficiently focuses on reducing the number of choices that the following stage must consider, the MAP optimization described herein is very quick, while providing all of the regularization benefits.

The second segmentation stage 110 described herein above effectively utilizes the first segmentation stage 105 to automatically determine the required representative color distribution for the different motion regions defined by the motion boundaries. The automated segmentation stage 110 uses color information without the typical need for any human input and still achieves computational efficiency (even though the lack of human input doesn't in itself lead to computational efficiency).

It is appreciated that the motion-based, multi-stage video segmentation 100 described herein above may be combined with other methods for producing object boundaries, such as, for example those using a depth camera. In this case, the depth camera can be used to determine a preliminary segmentation. This preliminary segmentation can then serve as the target for a better segmentation and boundary refinement performed by the motion-based, multi-stage video segmentation 100 described above, in this embodiment, the regions selected by the segmentation 100 can be chosen according to the preliminary boundaries provided by the depth camera segmentation, resulting in an even more computationally efficient segmentation.

Figure 7:
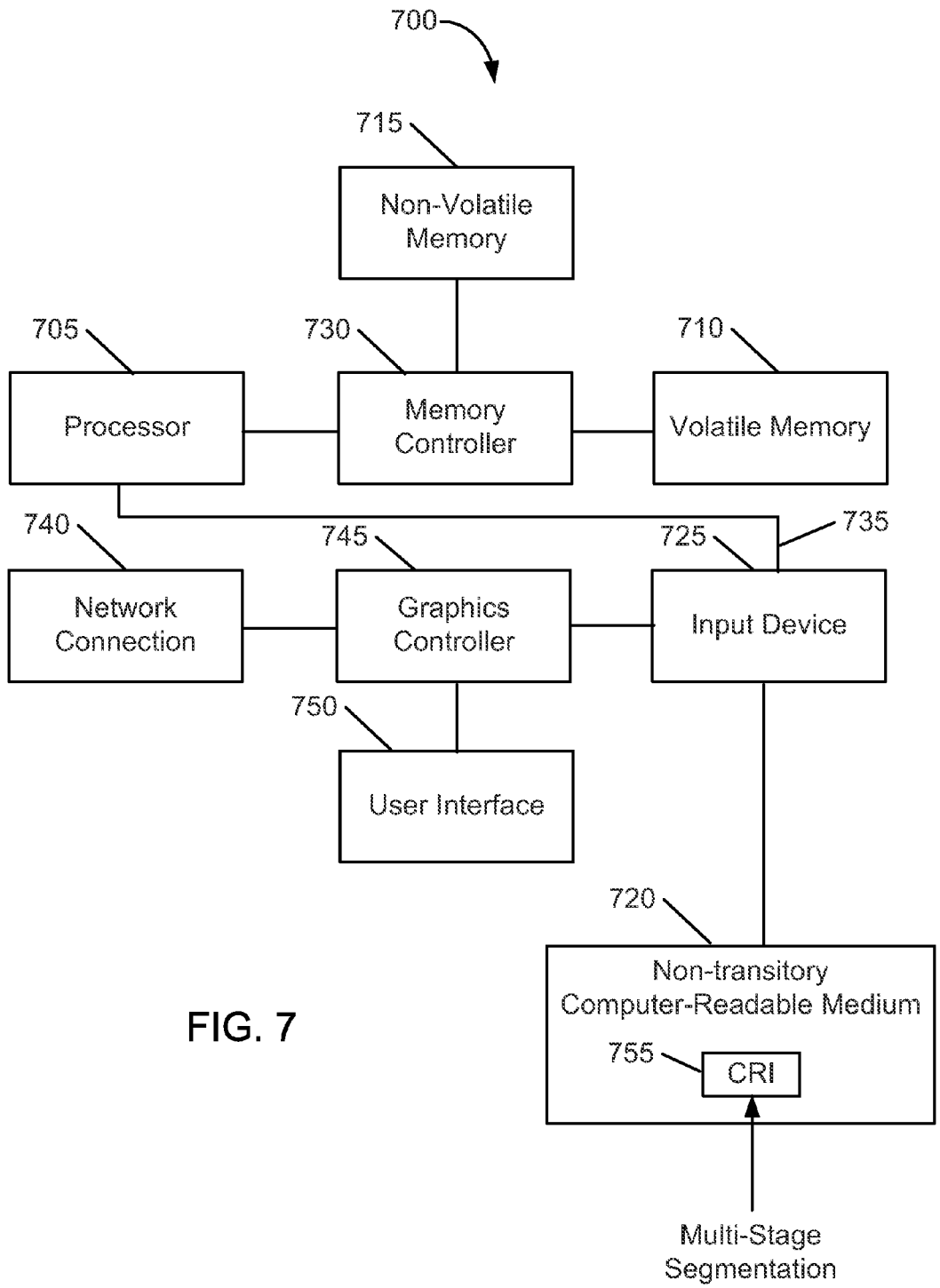
FIG. 7 is a block diagram of an example of a computing system for implementing the motion-based, multi-stage video segmentation of FIG. 1.

Attention is now directed to FIG. 7, which illustrates a block diagram of an example of a computing system 700 for implementing the motion-based, multi-stage video segmentation 100 according to the present disclosure. The system 700 can include a processor 705 and memory resources, such as, for example, the volatile memory 710 and/or the non-volatile memory 715, for executing instructions stored in a tangible non-transitory medium (e.g., volatile memory 710, non-volatile memory 715, and/or computer readable medium 720) and/or an application specific integrated circuit ("ASIC"), including logic configured to perform various examples of the present disclosure.

A machine (e.g., a computing device) can include and/or receive a tangible non-transitory computer-readable medium 720 storing a set of computer-readable instructions (e.g., software) via an input device 725. As used herein, the processor 705 can include one or a plurality of processors such as in a parallel processing system. The memory can include memory addressable by the processor 705 for execution of computer readable instructions. The computer readable medium 720 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 715 can be a local or remote database including a plurality of physical non-volatile memory devices.

The processor 705 can control the overall operation of the system 700. The processor 705 can be connected to a memory controller 730, which can read and/or write data from and/or to volatile memory 710 (e.g., RAM). The memory controller 730 can include an ASIC and/or a processor with its own memory resources e.g., volatile and/or non-volatile memory). The volatile memory 710 can include one or a plurality of memory modules (e.g., chips).

The processor 705 can be connected to a bus 735 to provide communication between the processor 705, the network connection 710, and other portions of the system 700. The non-volatile memory 715 can provide persistent data storage for the system 700. Further, the graphics controller 745 can connect to a user interface 750, which can provide an image to a user based on activities performed by the system 700.

Each system 700 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., the non-transitory computer-readable medium 720). The non-transitory computer-readable medium 720 can be integral, or communicatively coupled, to a computing device, in either a wired or wireless manner. For example, the non-transitory computer-readable medium 720 can be an internal memory, a portable memory, a portable disk, or a memory located internal to another computing resource (e.g., enabling the computer-readable instructions to be downloaded over the Internet). The non-transitory computer-readable medium 720 can have computer-readable instructions 755 stored thereon that are executed by the control circuitry (e.g., processor) to provide the motion-based, multi-stage video segmentation 100 according to the present disclosure.

The non-transitory computer-readable medium 720, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 720 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular computing system configuration, such as computing system 700.

Those of skill in the art would further appreciate that the various illustrative modules and steps described in connection with the embodiments disclosed herein may be implemented as electronic hardware, computer software, or combinations of both. For example, the segmentation stages 105-110 in FIG. 1 may comprise software modules, hardware modules, or a combination of software and hardware modules. Thus, in one embodiment, one or more of the segmentation stages 105-110 may comprise circuit components. In another embodiment, one or more of the segmentation stages 105-110 may comprise software code stored on a computer readable storage medium, which is executable by a processor.

To clearly illustrate this interchangeability of hardware and software, various illustrative components, blocks, modules, and steps have been described above generally in terms of their functionality (e.g. the first segmentation stage 105 is generally used to identify motion boundaries in a MAP-MRF framework and the second segmentation stage 110 is generally used to refine the motion boundaries using color information). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method for performing a motion-based, multi-stage segmentation of a video frame, the method comprising:
identifying motion boundaries in a plurality of sub-blocks of the video frame in a first segmentation stage, the motion boundaries identified by computing an occlusion-insensitive localized motion cost on a 3-level image map and minimizing a MAP-MRF energy based on the localized motion cost; and
refining the motion boundaries in a second segmentation stage by adding a color cost to the localized motion cost.

2. The method of claim 1, wherein the localized motion cost comprises a backward motion cost a forward motion cost.

3. The method of claim 1, wherein computing the localized motion cost comprises using the video frame, a previous video frame, and a forward video frame.

4. The method of claim 3, wherein computing the localized motion cost comprises determining a primary backward translational motion for at least one sub-block in the plurality of sub-blocks of the video frame.

5. The method of claim 4, wherein computing the localized motion cost comprises determining a plurality of neighborhoods centered at a plurality of pixels in the at least one sub-block.

6. The method of claim 5, further comprising determining a secondary motion.

7. The method of claim 1, further comprising minimizing the MAP-MRF energy using graph cuts.

8. The method of claim 1, wherein refining the motion boundaries comprises computing color clusters for motion regions formed by the motion boundaries.

9. The method of claim 8, wherein the color cost comprises an OCCD measure applicable to colors in the color clusters.

10. The method of claim 1, further comprising re-minimizing the MAP-MRF energy with the color cost added to the motion cost to determine a set of refined motion boundaries.

11. The method of claim 1, further comprising using a depth camera to identify preliminary motion boundaries for the first segmentation stage.

12. A non-transitory computer-readable medium having instructions stored thereon executable by a processor to:
   form a 3-level image map for a video frame, the video frame divided into sub-blocks;
   compute a primary motion for at least one sub-block based on the 3-level image map;
   determine a secondary motion for the at least one sub-block;
   compute an occlusion-insensitive localized motion cost for the at least one sub-block involving the primary and secondary motions;
   determine a set of motion boundaries for the at least one sub-block based on the localized motion cost; and
   refine the set of motion boundaries for the at least one sub-block based on color information of the at least one sub-block.

13. The non-transitory computer-readable medium of claim 12, wherein the primary motion comprises a translational motion.

14. The non-transitory computer-readable medium of claim 13, comprising instructions to compute the translational motion using XOR correlation.

15. The non-transitory computer-readable medium of claim 12, wherein the instructions to determine a set of motion boundaries comprise instructions to minimize a MAP-MRF energy, with the localized motion cost used as an energy term.

16. The non-transitory computer-readable medium of claim 15, wherein the instructions to refine the set of motion boundaries comprise instructions to:
   compute a color cost based on the color information;
   add the color cost to the localized motion cost to compute a weighted MAP-MRF energy; and
   minimize the weighted MAP-MU energy using graph cuts.

17. A computing system, comprising:
   shared memory resources; and
   a processor communicatively coupled to the shared memory resources, wherein the processor executes instructions stored in at least one of the shared memory resources to:
      form a graph to minimize a MAP-MRF energy defined by an occlusion-insensitive localized motion cost computed on a 3-level image map in a first segmentation stage to identify a set of motion boundaries for a video frame; and
      refine the set of motion boundaries based on a color cost added to the localized motion cost in a second segmentation stage.

18. The computing system of claim 17, wherein the MAP-MRF energy comprises an energy term and a regularization tem.

19. The computing system of claim 18, wherein the energy term comprises a function of the localized motion cost.

* * * * *

UNITED STATES PATENT AND TRADEMARK OFFICE
CERTIFICATE OF CORRECTION

| | | |
|---|---|---|
| PATENT NO. | : 8,526,674 B2 | Page 1 of 1 |
| APPLICATION NO. | : 13/018090 | |
| DATED | : September 3, 2013 | |
| INVENTOR(S) | : Andrew J Patti | |

It is certified that error appears in the above-identified patent and that said Letters Patent is hereby corrected as shown below:

In the Claims:

In column 8, line 66, in Claim 2, after "cost" insert -- and --. (second occurrence)

In column 10, line 20, in Claim 16, delete "MAP-MU" and insert -- MAP-MRF --, therefor.

In column 10, line 37, in Claim 18, delete "tem." and insert -- term. --, therefor.

Signed and Sealed this
Tenth Day of June, 2014

Michelle K. Lee
*Deputy Director of the United States Patent and Trademark Office*